C. B. GAMBLE.
WEIGHING MECHANISM AND MILEAGE RECORDER.
APPLICATION FILED OCT. 13, 1913.

1,113,609.

Patented Oct. 13, 1914.

2 SHEETS—SHEET 1.

Y—Y.

X—X.

WITNESSES
M. R. McInnis
E. A. Paul

INVENTOR
CHARLES B. GAMBLE
BY
Paul & Paul
ATTORNEYS

C. B. GAMBLE.
WEIGHING MECHANISM AND MILEAGE RECORDER.
APPLICATION FILED OCT. 13, 1913.

1,113,609.

Patented Oct. 13, 1914.
2 SHEETS—SHEET 2.

WITNESSES
M. R. McInnis
E. A. Paul

INVENTOR
CHARLES B. GAMBLE
BY
Paul & Paul
ATTORNEYS

UNITED STATES PATENT OFFICE.

CHARLES B. GAMBLE, OF MINNEAPOLIS, MINNESOTA.

WEIGHING MECHANISM AND MILEAGE-RECORDER.

1,113,609.  Specification of Letters Patent.  Patented Oct. 13, 1914.

Application filed October 13, 1913. Serial No. 794,867.

*To all whom it may concern:*

Be it known that I, CHARLES B. GAMBLE, a citizen of the United States, resident of Minneapolis, Hennepin County, Minnesota, have invented certain new and useful Improvements in Weighing Mechanism and Mileage-Recorders, of which the following is a specification.

My invention relates to a device for utilizing the deflection of the springs of a vehicle for weighing the load on the vehicle, the revolution of the wheels being utilized for measuring the distance traveled, the combination of the two indicating the ton miles covered by the vehicle in any given time.

My invention consists generally in the combinations hereinafter described and particularly pointed out in the claims.

Figure 1:
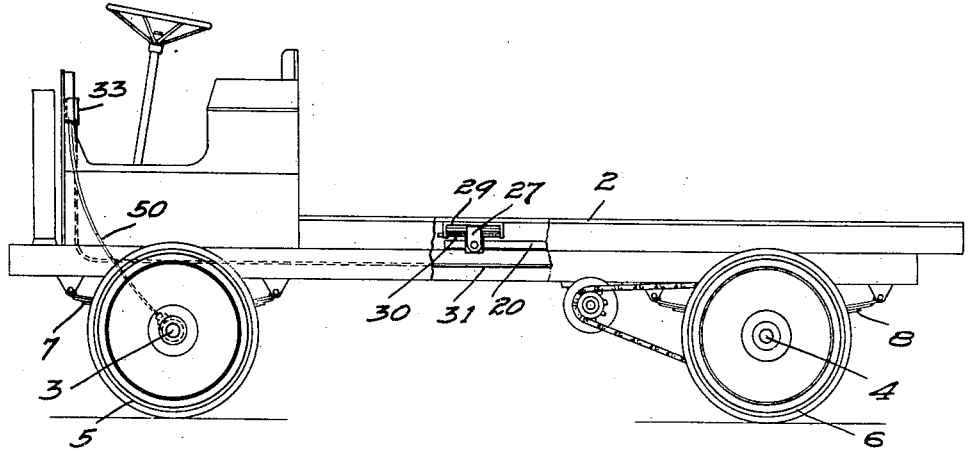
Figure 2:
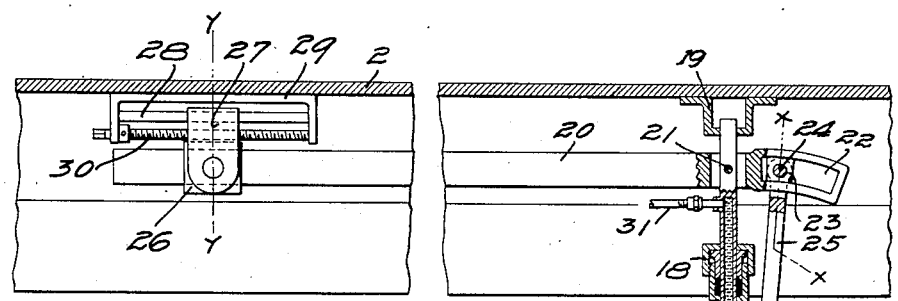
Figure 4:
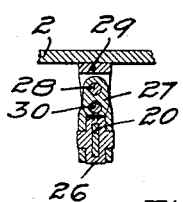
Figure 3:
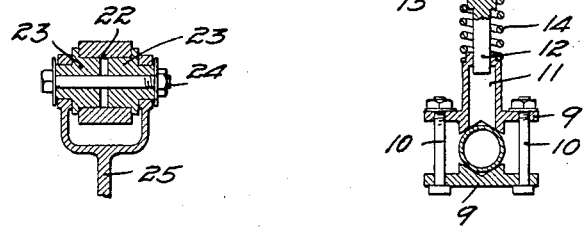
Figures 5, 6:
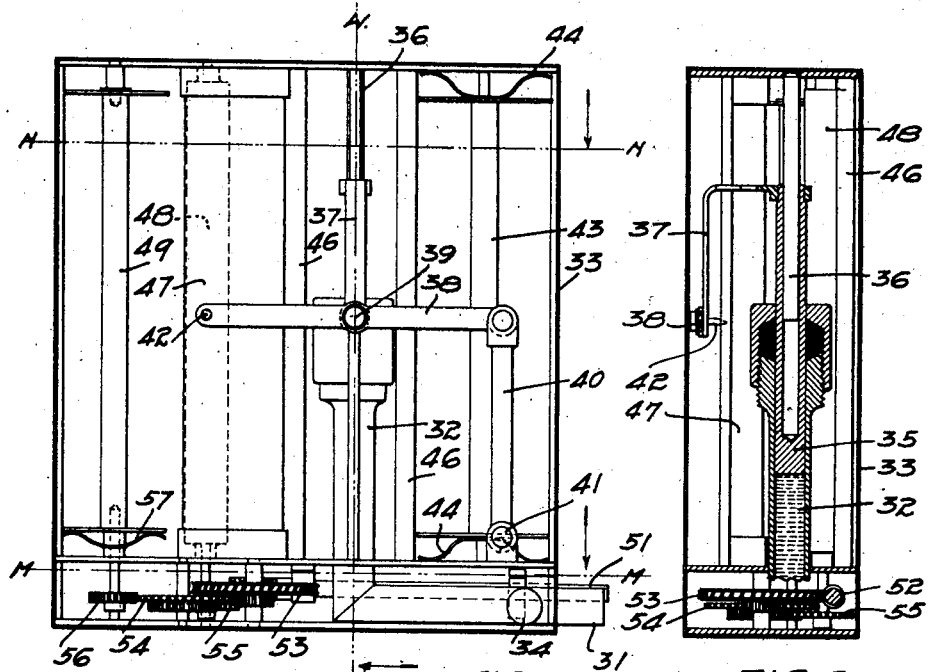
Figure 8:
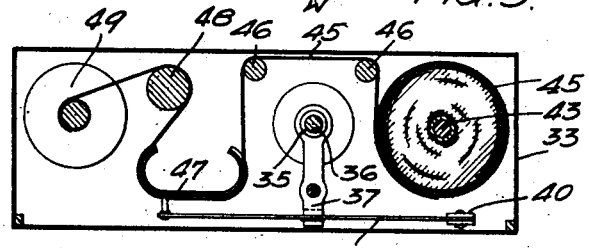
Figure 7:
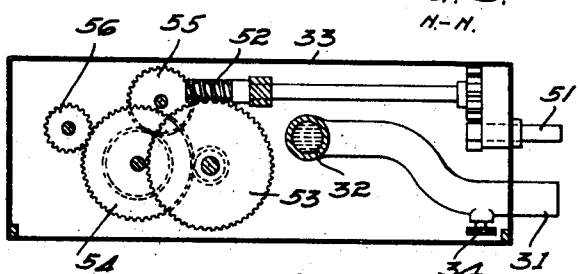
Figure 9:
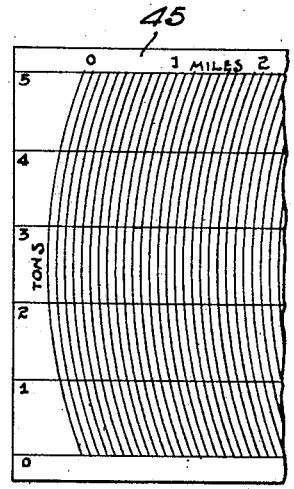

In the accompanying drawings forming part of this specification, Figure 1 is a side elevation of a power driven truck to which my invention is applied, Fig. 2 is a detail sectional view illustrating the application of my invention to the axle and truck body, Fig. 3 is a sectional view on the line $x$—$x$ of Fig. 2, Fig. 4 is a sectional view on the line $y$—$y$ of Fig. 2, Fig. 5 is a detail view, showing the mechanism for operating the recorder and moving the sheet on which the record is made, Fig. 6 is a sectional view on the line $w$—$w$ of Fig. 5, Fig. 7 is a sectional view on the line $m$—$m$ of Fig. 5, Fig. 8 is a sectional view on the line $n$—$n$ of Fig. 5, Fig. 9 is a detail view of a portion of the ribbon or tape on which the record is made.

In the drawing, 2 represents a truck frame having forward and rear axles 3 and 4, carrying wheels 5 and 6 and springs 7 and 8. This truck is of the ordinary power driven type and the frame and running gears are of ordinary construction. I have shown the device attached to a truck of this kind as typical of the application of the invention to a vehicle, but do not confine myself to such use, as the invention is capable of attachment to other types of vehicle. I will now describe the preferred manner of applying the invention to the truck.

9 is a clamp, secured to the rear axle by bolts 10 and having a guide 11 thereon in which a stud 12 formed on the lower end of a cylinder 13 is slidable, a cushion spring 14 being provided on said stud between the upper end of the guide 11 and the cylinder, for the purpose of taking up the shock when the truck is running over rough ground. The cylinder has an oil chamber 15 therein and guide flanges 16 are preferably provided above this chamber for a tube 17 having an open lower end which projects into the oil chamber 15. The upper end of the tube projects through a cap 18 at the top of the cylinder and this cap and the flanges 16 form guides for the tube as it reciprocates. A guide 19 is secured to the bottom of the truck frame, and has an opening therein to receive the upper end of the tube 17. A lever 20 has a pivotal connection at 21 with the upper closed portion of said tube and one end of said lever has a curved slot 22 therein in which a block 23 is slidable and secured at any point in the slot 22 by a bolt 24. A link 25 has a forked end journaled on the block 23 and is pivotally connected at its opposite end to the lower portion of the cylinder 13. The link 25 is thus pivotally supported at both ends, the stroke of the cylinder being regulated by the adjustment of the block 23 toward or from the pivotal connection 21 of the lever 20 with the tube 17. In attaching the device to a vehicle the link 25 is adjusted in the curved slot of the lever 20 until the travel of the plunger 17 for a given load is registered correctly on the record sheet. This adjustment in the slot 22 will be varied according to the capacity of the truck or vehicle on which the apparatus is mounted. The other end of the lever 20 is supported in a block 26 that is pivoted in a hanger 27 that is mounted to slide on a rod 28 in a frame 29 that is secured to the bottom of the truck frame. A screw 30 is mounted in the frame 29 and has a threaded connection with the hanger 27 for the purpose of adjusting it back and forth on the lever 20 to attain a point on the truck 40 which will have a constant deflection for a given load, regardless of the position of the load on the truck, and which is an indication of the strength of the front and rear springs. In making an adjustment of the device to a vehicle, it will be necessary, of course, to adjust the moving parts commensurate with the deflection of the springs under load and by providing these adjustable connections I am able to easily and quickly obtain the proper adjustment for different strengths of all springs and different strengths of front and rear springs. The lower open portion of the tube 17 has a pipe 31 leading therefrom to a cylinder 32 mounted within a casing 33 that is preferably arranged on the forward portion of the machine adjacent to the forward wheels. A device, preferably a valve 34, is provided in this pipe by means of which the flow of oil between the cylinders can be controlled. Within the cylinder 32 is a piston 35 adapted to slide on a rod 36 mounted in the frame 33. On this piston I arrange an arm 37 and a bar 38 is centrally pivoted at 39 on this arm and is pivotally connected at one end to a bar 40 which has a pivotal connection at 41 with the frame 33. The other end of the bar 38 is provided with a marking point or pin 42.

A roll 43 is journaled in the frame 33 and held by springs 44 against premature movement and carries a tape or ribbon 45 which is ruled and graduated to indicate ton miles. The graduations representing tons are arranged transversely of the ribbon and those representing miles lengthwise thereof, the lines separating the ton graduations running parallel with the longitudinal edges of the ribbon, while those indicating fractions of miles are drawn on the arc of a circle having a radius of the marking point or pin. The ribbon passes over idle rolls 46 and from thence under a plate 47 having a flat surface between which and the marking point the recording ribbon or tape is inserted and fed.

48 is a friction feed roll and 49 a roll or drum on which the tape bearing the marks indicating tons and miles is reeled. This tape is fed by a mechanism connected with a wheel of the vehicle and this mechanism I will now describe in detail.

50 is a flexible shaft having any suitable driving connection with one of the forward wheels, such connection being in common use and I have not thought it necessary to illustrate it herein. A stud 51 is connected with the flexible shaft 50 and geared to a worm 52 which meshes with a worm wheel 53. This worm wheel has a pinion meshing with the gear 54 which drives the friction roll 48 through a gear 55 and the reel or drum 49 through the gear 56. The movement of these gears is so timed or proportioned that the friction roll 48 will keep the ribbon taut on the face of the plate 47 and the roll 49 will be operated through the friction clutch 57, at a sufficient speed to take up the slack in the ribbon. This reel is readily removable from its driving connection, so that at the end of the day's run the record sheet, or that portion wound on the reel, can be removed and the owner of the vehicle can, at a glance, ascertain the weight of each load placed on the truck and the miles the truck has traveled during the day. In this way an accurate estimate can be formed of the service to be performed by a truck and its value as compared with the cost of its upkeep.

In the operation of the device, the tube or plunger 17 will be forced downwardly as the load is placed on the truck and the oil in the chamber 15 will be forced through the pipe 31 into the cylinder 32 to move the plunger 35 and start the marking point 42 across the paper. This movement will continue until the truck is fully loaded, the record sheet indicating the weight on the truck in tons and fractions thereof. As soon as the machine is started, the record sheet will begin to move and the marking point bearing thereon will indicate the number of miles the truck travels under the load. This line will, of course, waver back and forth, due to the oscillation of the load and the deflection of the springs running over rough ground. Such oscillation can be made small by checking the flow of oil with the valve 34 and allowing the spring 14 to take up the jar. At the end of the day an examination of the record sheet will disclose the weight of the loads that have been placed on and removed from the truck, and the distance in miles that the truck has traveled. The area under the record lines computed to a suitable scale will give the total ton miles made by the truck.

In various ways the details of construction herein shown and described may be modified, particularly the manner of mounting the device on the vehicle and the mechanism employed for operating the marking point and the record sheet, and I do not, therefore, wish to be confined to the particular construction herein shown.

I claim as my invention:—

1. The combination, with a vehicle body, its carrying wheels and springs, of a record sheet graduated to indicate the load on said vehicle body, a marking device mounted to move on said record sheet and mechanism actuated by the weight of the load on said vehicle body for operating said marking device, said mechanism including cylinders having a pipe connection between them and containing an inelastic fluid, and pistons for said cylinders, one of said pistons being connected with the vehicle body, the other of said pistons having means for connection with said marking device.

2. The combination, with a vehicle body, its axles and carrying wheels and supporting springs, of a cylinder mounted on the rear axle of said vehicle, a plunger therefor, a lever pivoted at a point intermediate to its ends on said plunger and pivotally connected at one end to said vehicle body, a rod pivotally connected with said cylinder and having an adjustable connection with said lever, a second cylinder and plunger having a pipe connection with said first named cylinder, an inelastic fluid for said cylinders, the depression of said first named plunger forcing the fluid into said second named cylinder to actuate its piston, a record sheet, and a marker operatively connected with said second plunger and movable on said record sheet.

3. The combination, with a vehicle body, its carrying wheels and springs, of a record sheet graduated to indicate the load on said vehicle body and also graduated to indicate the miles of travel of said body, a marking device, mechanism actuated by the depression of the vehicle body under the weight of the load for operating said marking device to make a record of the load on the vehicle, and mechanism actuated by one of the carrying wheels for moving said sheet to indicate thereon the distance the vehicle has traveled.

4. The combination, with a vehicle body, its carrying wheels and springs, of a record sheet graduated transversely to indicate the load on said vehicle body and also graduated longitudinally to indicate the miles of travel of the vehicle, a marking device mounted to move transversely on said sheet, mechanism actuated by the depression of the vehicle body under load for operating said marking device, and mechanism actuated by one of the carrying wheels for moving said sheet lengthwise to indicate the distance of travel.

5. The combination, with a vehicle body, its carrying wheels and springs, of a record sheet graduated to indicate the load on said vehicle body and also graduated to indicate the miles of travel of said body, a marking device, and mechanism actuated by the depression of the vehicle body under load and by the movement of one of said carrying wheels for imparting a relative movement to said marking device and said record sheet for indicating on said sheet the load in tons and fractions thereof and the mileage of the vehicle.

In witness whereof, I have hereunto set my hand this 6th day of October, 1913.

CHARLES B. GAMBLE.

Witnesses:
EDWARD A. PAUL,
C. H. REHFUSS.